(12) United States Patent
Krey

(10) Patent No.: US 9,794,486 B2
(45) Date of Patent: Oct. 17, 2017

(54) OPTICAL IMAGE STABILIZER AND CAMERA MODULE INCLUDING THE SAME

(71) Applicant: SAMSUNG ELECTRO-MECHANICS CO., LTD., Suwon-Si (KR)

(72) Inventor: Ruslan Krey, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 4 days.

(21) Appl. No.: 14/956,742

(22) Filed: Dec. 2, 2015

(65) Prior Publication Data

US 2016/0227118 A1   Aug. 4, 2016

(30) Foreign Application Priority Data

Jan. 29, 2015  (KR) .................. 10-2015-0014026

(51) Int. Cl.
 *H04N 5/232* (2006.01)
 *G02B 27/64* (2006.01)
(52) U.S. Cl.
 CPC ....... *H04N 5/23287* (2013.01); *G02B 27/646* (2013.01); *H04N 5/23258* (2013.01); *G03B 2217/005* (2013.01)
(58) Field of Classification Search
 CPC ........... H04N 5/23254; H04N 5/23264; H04N 5/23287

USPC ............... 396/55, 52, 53; 348/208.99, 208.1, 348/208.2, 208.4, 208.11; 359/554, 557
See application file for complete search history.

(56) References Cited

U.S. PATENT DOCUMENTS

2012/0033091 A1  2/2012 Miyasako
2016/0057445 A1* 2/2016 Tsubaki ............... H04N 19/521
                                                382/236

FOREIGN PATENT DOCUMENTS

JP        2012-37778 A      2/2012
KR    10-2014-0088310 A     7/2014

* cited by examiner

*Primary Examiner* — Rochelle-Ann J Blackman
(74) *Attorney, Agent, or Firm* — NSIP Law

(57) ABSTRACT

An optical image stabilizer including an angular velocity calculator configured to receive an angular velocity signal from an angular velocity sensor and output a corrected angular velocity signal and an angular position signal; a state detector configured to calculate an autocorrelation value according to the corrected angular velocity signal, compare the autocorrelation value with a threshold value to determine a stopped state or a moving state of a camera module, and output a corrected angular position signal and control coefficients; and a lens controller configured to control a lens module according to the corrected angular position signal and the control coefficients.

19 Claims, 7 Drawing Sheets

OPTICAL IMAGE STABILIZER AND CAMERA MODULE INCLUDING THE SAME

CROSS-REFERENCE TO RELATED APPLICATION

This application claims the benefit under 35 USC 119(a) of Korean Patent Application No. 10-2015-0014026 filed on Jan. 29, 2015, in the Korean Intellectual Property Office, the disclosure of which is incorporated herein by reference.

BACKGROUND

1. Field

The following description relates to an optical image stabilizer and a camera module including the same.

2. Description of Related Art

In addition to cameras and video cameras, commonly used as an image capturing devices, camera modules have been mounted in mobile devices. Such camera modules commonly include a lens, a lens barrel, an integrated circuit (IC) driving the lens. Since camera modules mounted in mobile devices such as smartphones have a lens aperture smaller than that of a general camera, an amount of light entering a camera module mounted in a mobile device is less than that of a general camera at the time of capturing an image. Therefore, camera modules mounted in mobile devices commonly have relatively slow shutter speeds in order to compensate for an insufficient amount of light. However, blurring of an image is generated even with a small amount of hand-shake, such that it may be difficult to obtain a clear image with such a camera module.

Research into technology for various types of optical image stabilizers (OISs), for instance, the OIS of Korean Patent No. 10-2014-0088310, has been conducted in an attempt to solve the problem of blurring of images generated due to the hand-shake or movement of a device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module including an optical image stabilizer in which a stopped state is reliably determined without being affected by noise, or temperature, or both, and a camera module including the same.

In another general aspect, the optical image stabilizer includes an angular velocity calculator configured to receive an angular velocity signal from an angular velocity sensor and output a corrected angular velocity signal generated by correcting the angular velocity signal and an angular position signal generated by integrating the corrected angular velocity signal; a state detector configured to calculate an autocorrelation value according to the corrected angular velocity signal, compare the autocorrelation value with a threshold value to determine a stopped state or a moving state of a camera module, and output a corrected angular position signal and control coefficients; and a lens controller configured to control a lens module according to the corrected angular position signal and the control coefficients.

In another general aspect, a camera module includes an angular velocity sensor detecting an angular velocity and output an angular velocity signal; an angular velocity calculator configured to output a corrected angular velocity signal generated by correcting the angular velocity signal and an angular position signal generated by integrating the corrected angular velocity signal; a state detector configured to calculate an autocorrelation value according to the corrected angular velocity signal, comparing the autocorrelation value with a threshold value to determine a stopped state or a moving state of the camera module, and outputting a corrected angular position signal and control coefficients; a lens controller configured to output a control signal according to the corrected angular position signal and the control coefficients; and a lens module configured to adjust a position of a lens barrel according to the control signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
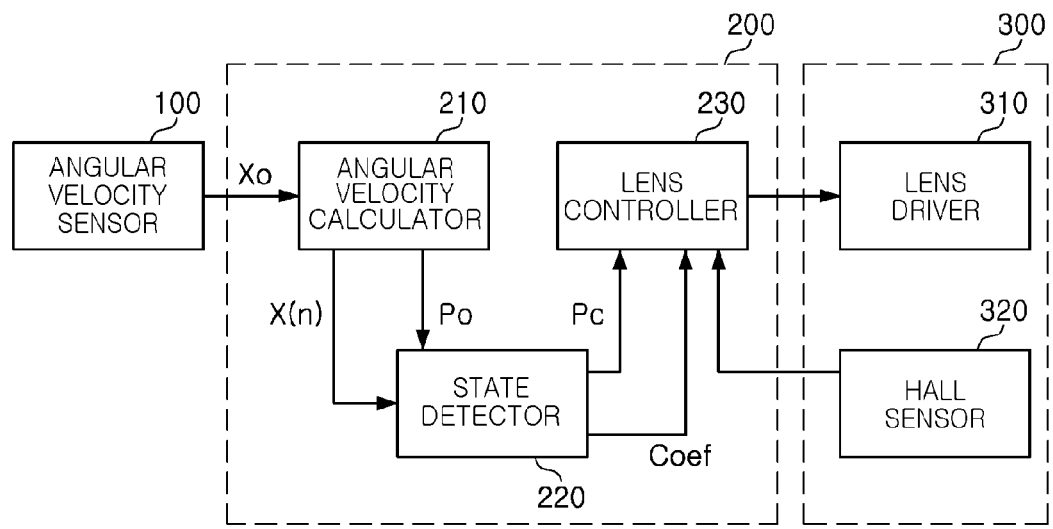
FIG. 1 is a block diagram illustrating an example of a camera module.

Referring to FIG. 1, the camera module includes an angular velocity sensor 100, an optical image stabilizer 200, and a lens module 300. The optical image stabilizer 200 includes an angular velocity calculator 210, a state detector 220, and a lens controller 230. In addition, the lens module 300 includes a lens driver 310 and a hall sensor 320.

The angular velocity sensor 100 detects an angular velocity and output an angular velocity signal Xo to the optical image stabilizer 200. In detail, the angular velocity sensor 100 is a sensor that detects shaking of a mobile device or a camera. The angular velocity sensor 100 may be a two-axis gyro sensor, or a three-axis gyro sensor, to detect angular velocity of movement.

The angular velocity calculator 210 receives an output from the angular velocity sensor 100 and outputs an angular position signal Po generated by integrating the angular velocity signal Xo. Additionally, the angular velocity calculator 210 performs a correction of the angular velocity signal Xo in order to remove accumulated errors (hereinafter, referred to as "drift") included in the angular velocity signal Xo due to a noise component during detection of a rotation angle by the angular velocity sensor 100.

The angular velocity calculator 210 integrates a corrected angular velocity signal X(n) generated by correcting the angular velocity signal Xo, thereby calculating the angular position signal Po. That is, the angular velocity calculator 210 outputs, to the state detector 220, the corrected angular velocity signal X(n) from which the noise component has been removed and the angular position signal Po generated by integrating the corrected angular velocity signal X(n).

The state detector 220 calculates an autocorrelation value on the basis of the corrected angular velocity signal X(n) and compares the autocorrelation value with a threshold value to determine a stopped state of the camera module. Here, the autocorrelation value (Aδ) is obtained by summing values obtained by multiplying the corrected angular velocity signal X(n) by a corrected angular velocity signal X(n-δ) before time lag (δ) of the corrected angular velocity signal X(n) during a sampling period R.

The autocorrelation value (Aδ) described above is calculated as represented by the following Equation 1:

$$A\delta = \sum_{n}^{n+R} X(n) \times X(n-\delta).$$ [Equation 1]

Here, R is the number of samplings performed in a single sampling period, and δ is time lag, which will be described below in reference to FIGS. 3A through 4C.

After the state detector 220 calculates the autocorrelation value (Aδ), the state detector 220 compares the autocorrelation value (Aδ) with the threshold value and determines that the camera module is in the stopped state when the autocorrelation value (Aδ) is equal to or less than the threshold value during a first determination period.

Then, the state detector 220 outputs a corrected angular position signal Pc and a control coefficient Coef depending on the stopped state determination.

When the camera module is determined to be in the stopped state, the state detector 220 gradually decreases the corrected angular position signal Pc and the control coefficients Coef to values corresponding to a zero point (for example, 0) in the stopped state and output the values.

Therefore, in the optical image stabilizer and the camera module including the same, a delay time required for outputting the angular position signal, generated by correcting and integrating the angular velocity signal as the value corresponding to the zero point in the stopped state, is significantly decreased.

After the state detector 220 calculates the autocorrelation value (Aδ), the state detector 220 compares the autocorrelation value (Aδ) with the threshold value and determines that the camera module is in a moving state when the autocorrelation value (Aδ) is equal to or greater than the threshold value during a second determination period. When the state detector 220 determines that the camera module is in the moving state, the state detector 220 outputs the corrected angular position signal Pc to follow the angular position signal Po during a following time, and output the corrected angular position signal Pc having the same level as the angular position signal Po after the following time.

Therefore, in the optical image stabilizer of the camera module, an image jump phenomenon, generated when immediately outputting the corrected angular position signal Pc having the same level as the angular position signal P at the time of determining the moving state of the camera module, is prevented.

The lens controller 230 receives the corrected angular position signal Pc and the control coefficient Coef and outputs a control signal to the lens module 300. In addition, the lens controller 230 receives feedback information output by the lens module 300 in order to calculate corrected positional information according to the feedback information and reflect the corrected positional information in the control signal. The control coefficient Coef may be a plurality of control coefficients for a proportional integral derivative (PID) controller included in the lens controller 230.

The lens driver 310 included in the lens module 300 receives the control signal to adjust a position of a lens barrel (not illustrated) supporting a lens or a lens group. The lens driver 310 may comprise a voice coil motor (VCM) using electromagnetic force of a coil and a magnet, an ultrasonic motor using a piezoelectric element, a shape memory alloy, or any combination thereof.

The hall sensor 320 detects positional information of the lens, supported by the lens barrel and moved by the lens driver 310, and outputs this as feedback information.

Figure 2:
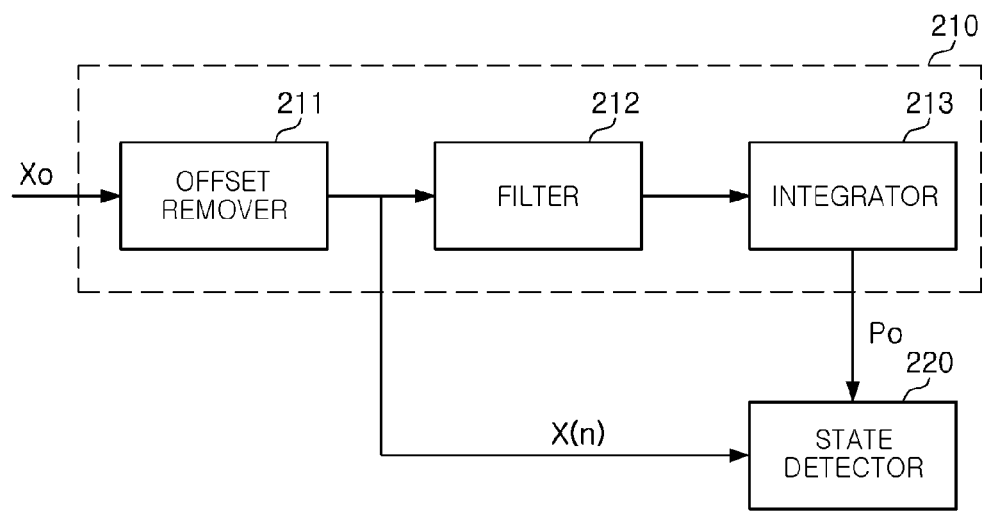
FIG. 2 is a block diagram illustrating an example of an angular velocity calculator of the camera module.

Referring to FIG. 2, the angular velocity calculator 210 includes an offset remover 211, a filter 212, and an integrator 213.

The offset remover 211 and the filter 212 perform the correction of the angular velocity signal Xo in order to remove drift included in the angular velocity signal Xo due to the noise component during detection of the rotation angle by the angular velocity sensor 100 (see FIG. 1).the rotation angle by the angular velocity sensor 100 (see FIG. 1). Since the noise component is indicated by a specific frequency, the filter 212 may include a high pass filter in order to remove the noise component.

When drift is generated due to accumulation of the noise component at the time of detecting the rotation angle by the angular velocity sensor 100 (see FIG. 1), a significant amount of time (for example, several tens of seconds) may be required for the filter 212 to remove this noise component. Therefore, the offset remover 211 removes an offset from the angular velocity signal Xo as preprocessing for filtering.

When the corrected angular velocity signal X(n) is branched from an output of the offset remover 211 and is then output to the state detector 220, as illustrated in FIG. 2, the corrected angular velocity signal X(n) is branched from an output of the filter 212 and then output to the state detector 220.

The integrator 213 integrates the angular velocity signal output by the filter 212 and outputs the angular position signal Po to the state detector 213.

FIGS. 3A through 3D are graphs illustrating a method of selecting time lag of the camera module.

Figure 3A:
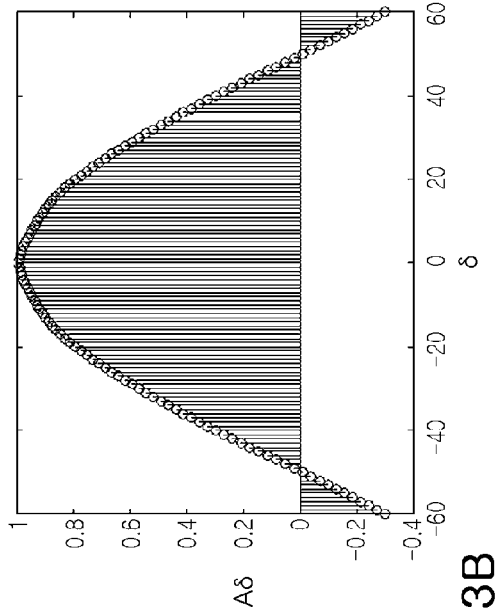
FIGS. 3A and 3B are graphs illustrating an example of an autocorrelation value $A\delta$ in an X axis direction.
Figure 3B:
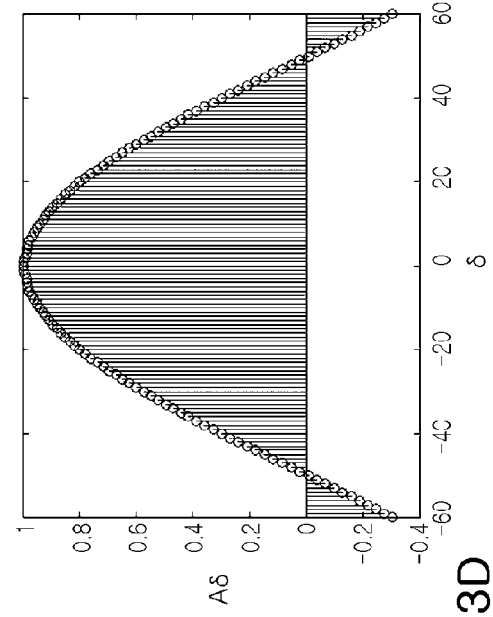
Figure 3C:
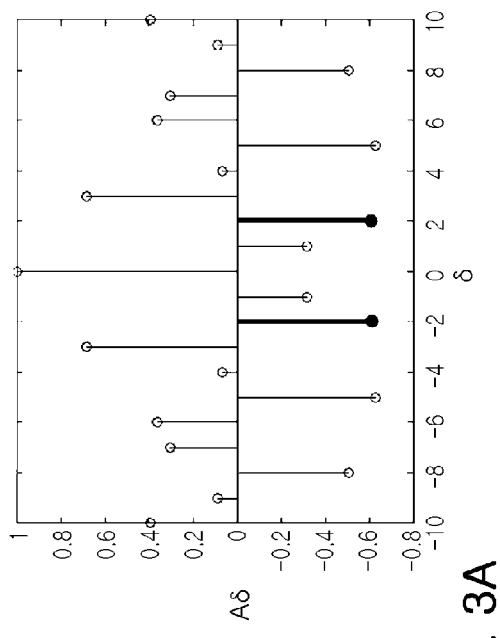
FIGS. 3C and 3D are graphs illustrating an example of an autocorrelation value $A\delta$ in a Y axis direction.
Figure 3D:
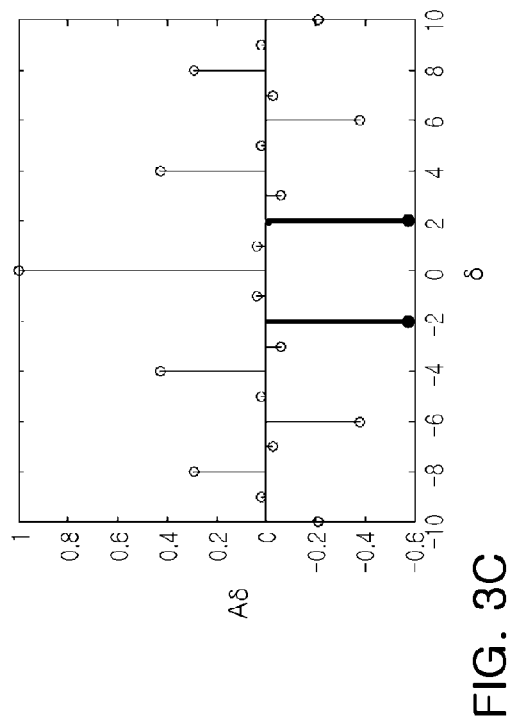

FIGS. 3A and 3B are graphs illustrating an autocorrelation value Aδ calculated on the basis of an angular velocity signal in an X axis direction when a two-axis (X and Y) gyro sensor is used as the angular velocity sensor 100 (see FIG. 1); and FIGS. 3C and 3D are graphs illustrating an autocorrelation value Aδ calculated on the basis of an angular velocity signal in a Y axis direction when the two-axis (X and Y) gyro sensor is used as the angular velocity sensor 100.

Here, FIG. 3A is a graph illustrating an autocorrelation value Aδ calculated in a case in which the camera module is in a stopped state; and FIG. 3B is a graph illustrating an autocorrelation value Aδ calculated in a case in which the camera module is in a moving state.

Referring to FIGS. 3A and 3B, the autocorrelation value Aδ in the stopped state of the camera module is calculated as a negative number when the time lag δ has a predetermined value (for example, 2). In contrast, the autocorrelation value Aδ in the moving state of the camera module (as shown in FIG. 3B)is calculated as a positive number when the time lag δ has a predetermined value (for example, 2).

Referring to FIGS. 3C and 3D, the autocorrelation value Aδ in the stopped state of the camera module is calculated as a negative number in a case in which the time lag δ has a predetermined value (for example, 2). In contrasts, the autocorrelation value Aδin the moving state of the camera module (as shown in FIG. 3D) is a positive number when the time lag δ has a predetermined value (for example, 2).

According to these results, the time lag δ is selected so that the autocorrelation value Aδ in the stopped state is in contrast to that in the moving state.

Although the time lag δ will be set to 2 in the following description, this is only an example, and the time lag is not limited thereto.

Figure 4A:
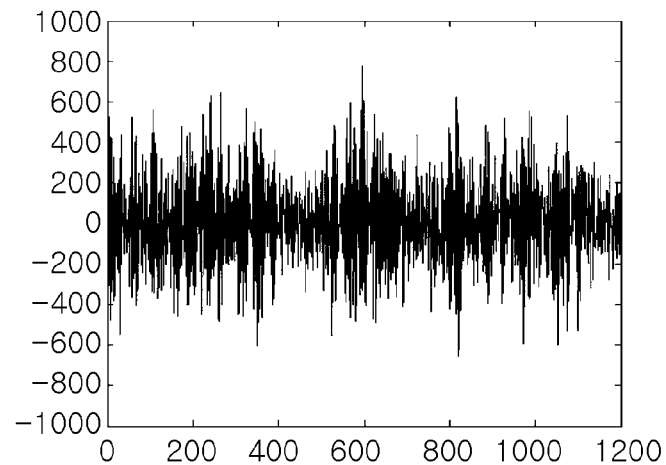
FIG. 4A illustrating an example of an angular velocity signal in the stopped state of the camera module.

In a graph of FIG. 4A illustrating an angular velocity signal output by the angular velocity sensor 100 (see FIG. 1) in the stopped state of the camera module, a vertical axis represents a magnitude of an angular velocity, and a horizontal axis represents the number of samplings.

Figure 4B:
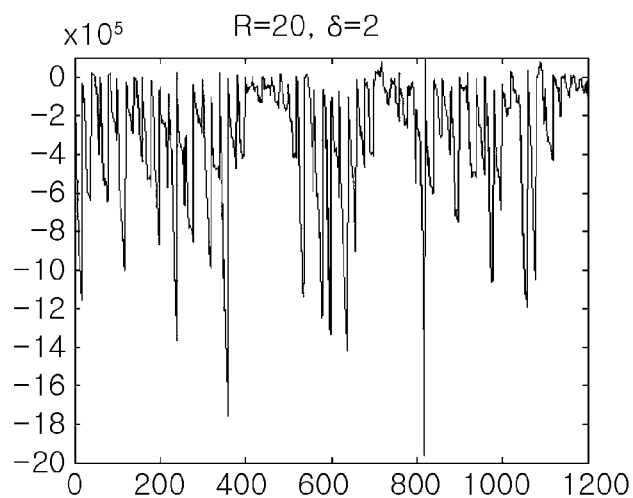
FIG. 4B illustrates an example of an autocorrelation value $A\delta$ calculated by setting the number R of samplings performed in a single sampling period to 20 and setting time lag $\delta$ to 2.
Figure 4C:
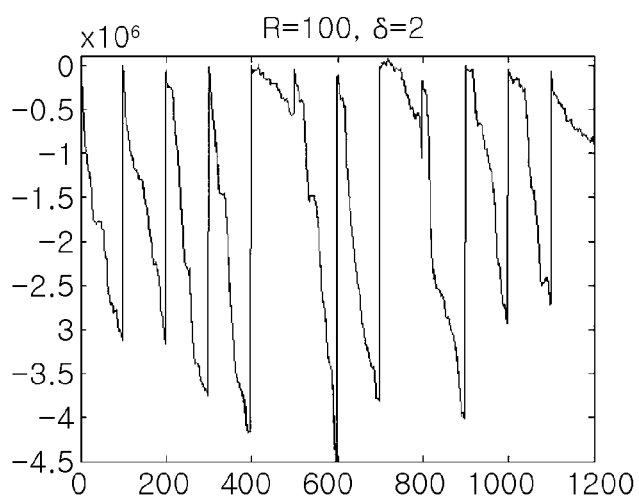
FIG. 4C illustrates an example of an autocorrelation value AS calculated by setting the number R of samplings performed in a single sampling period to 100 and setting time lag $\delta$ to 2.

In graphs of FIGS. 4B and 4C illustrating an autocorrelation value Aδ calculated according to a corrected angular velocity signal obtained by correcting the angular velocity signal illustrated in FIG. 4A, a vertical axis represents the autocorrelation value Aδ, and a horizontal axis represents the number of samplings.

FIG. 4B illustrates an autocorrelation value Aδ calculated by setting the number R of samplings performed in a single sampling period to 20 and setting time lag δ to 2.

FIG. 4C illustrates an autocorrelation value Aδ calculated by setting the number R of samplings performed in a single sampling period to 100 and setting time lag δ to 2.

Referring to FIGS. 4A through 4C, the number R of samplings performed in a single sampling period for calculating the autocorrelation value Aδ may be selected depending on a sampling rate of the angular velocity signal, the characteristics of the angular velocity sensor, and a design for improving reliability in stopped state determination. The number R of samplings performed in a single sampling period of the corrected angular velocity signal for calculating the autocorrelation value Aδ may be 20 to 100.

Figure 5A:
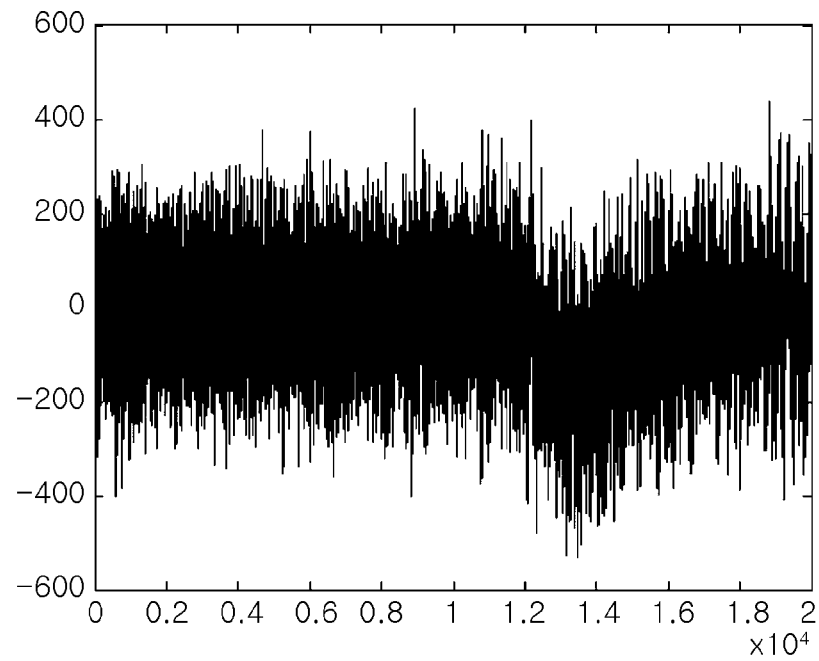
FIG. 5A is a graph illustrating an example of an angular velocity signal when a state of the camera module is changed from a stopped state to a moving state.

FIG. 5A is a graph illustrating an angular velocity signal output by the angular velocity sensor 100 (see FIG. 1) when a state of the camera module is changed from a stopped state to a moving state.

Figure 5B:
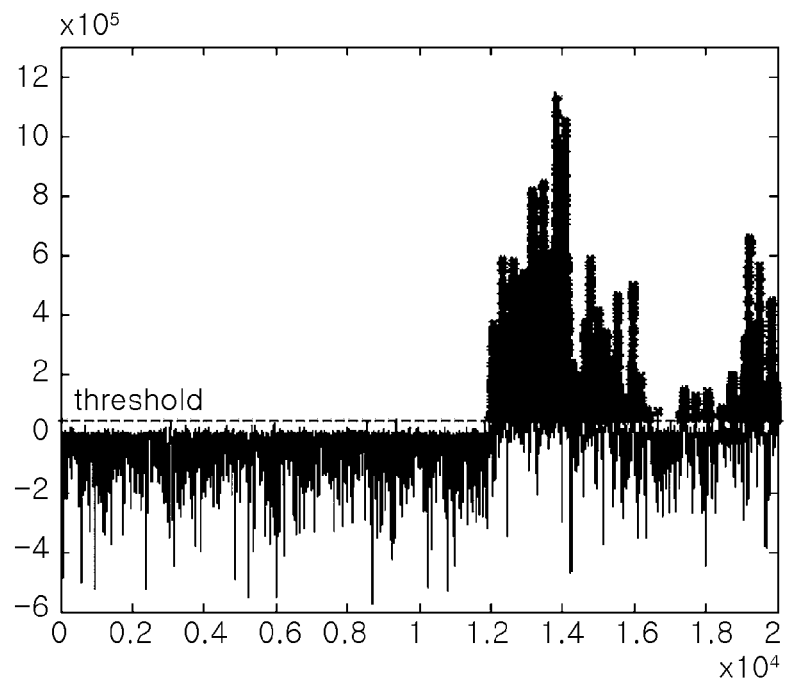
FIG. 5B is a graph illustrating an example of an autocorrelation value $A\delta$ when the state of the camera module is changed from the stopped state to the moving state.

FIG. 5B is a graph illustrating an autocorrelation value Aδ calculated on according to the angular velocity signal when the state of the camera module is changed from the stopped state to the moving state.

Referring to FIGS. 5A and 5B a change in the angular velocity signal, according to camera module movement, is reflected in the autocorrelation value Aδ, and thus, an autocorrelation value Aδ equal to or greater than a threshold value is calculated.

Figure 6A:
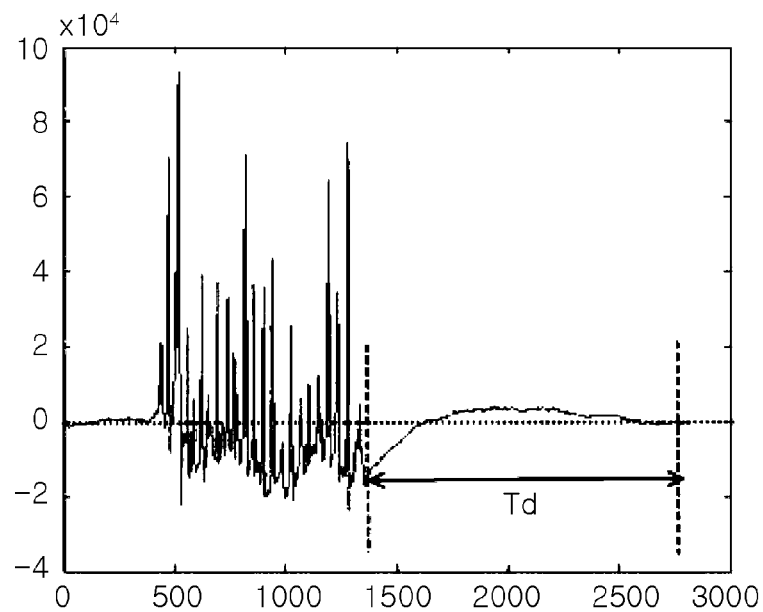
FIG. 6A is a graph illustrating an example of an angular position signal when a state of the camera module is changed from a moving state to a stopped state.

FIG. 6A is a graph illustrating an angular position signal when a state of the camera module is changed from a moving state to a stopped state.

Figure 6B:
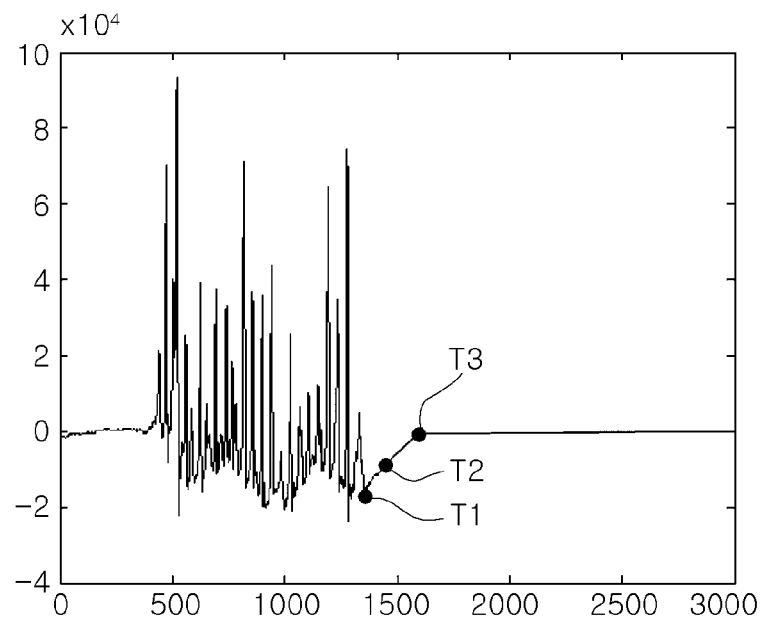
FIG. 6B is a graph illustrating an example of a corrected angular position signal in the case in which a state of the camera module is changed from a moving state to a stopped state.

FIG. 6B is a graph illustrating a corrected angular position signal when a state of the camera module is changed from a moving state to a stopped state.

Referring to FIG. 6A, a significant amount of time Td is required from a point in time at which the state of the camera module is changed from the moving state to the stopped state to a point in time at which the angular position signal is output as a value corresponding to a zero point in the stopped state.

Referring to FIG. 6B, the optical image stabilizer determines a point in time T2 as the stopped state of the camera module while an autocorrelation value equal to or less than the threshold value is continued for a first determination period from a point in time T1 at which the autocorrelation value equal to or less than the threshold value is sensed. The optical image stabilizer outputs a value corresponding to a zero point in the stopped state at a predetermined point in time T3 by gradually decreasing the angular position signal (in relation to an absolute value) to the value (for example, 0) corresponding to the zero point in the stopped state. Therefore, in the optical image stabilizer of the camera module, the zero point may be rapidly corrected depending on the determination of the stopped state.

Figure 7A:
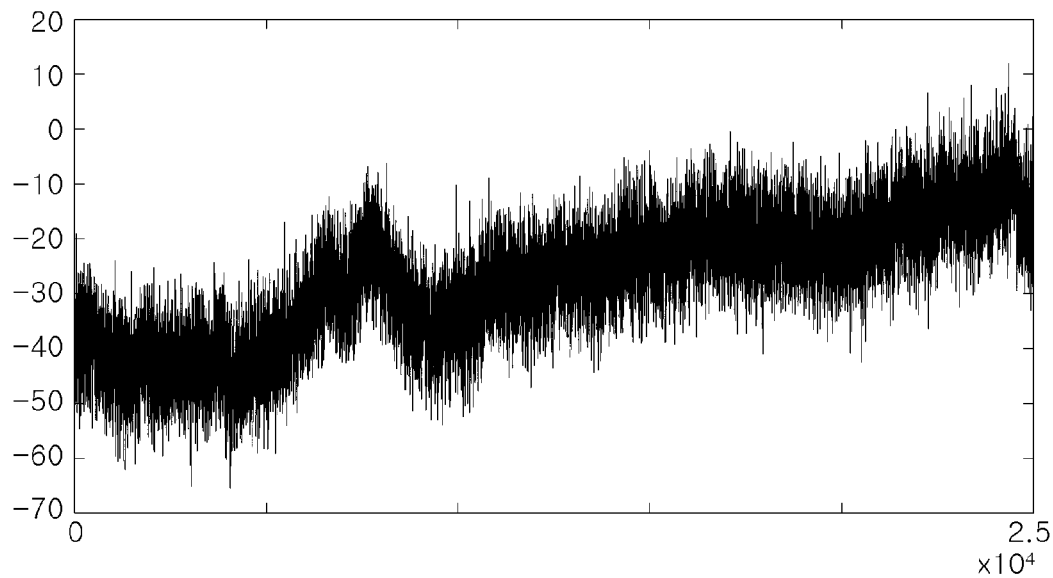
FIG. 7A is a graph illustrating an example of an angular position signal when drift is generated due to the accumulation of a noise component.

FIG. 7A is a graph illustrating an angular position signal in a case in which drift is generated due to the accumulation of a noise component.

Figure 7B:
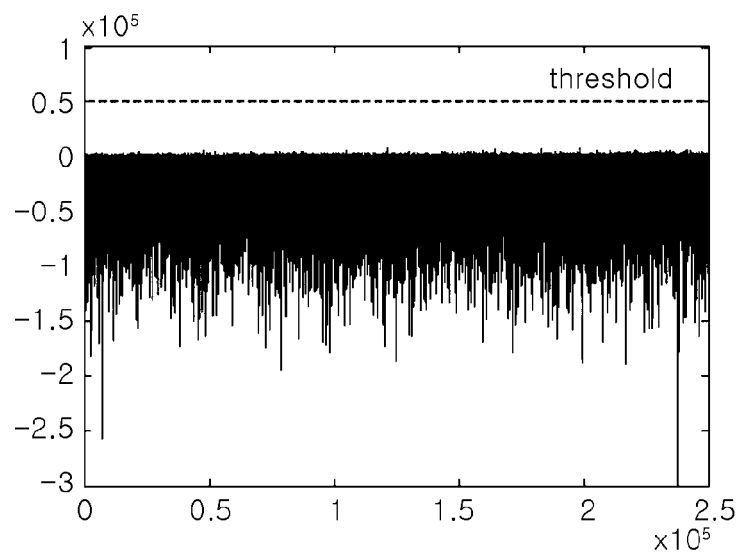
FIG. 7B is a graph illustrating an example of an autocorrelation value when drift is generated due to the accumulation of a noise component.

FIG. 7B is a graph illustrating an autocorrelation value calculated on the basis of an angular position signal in the case in which drift is generated due to the accumulation of a noise component.

Referring to FIGS. 7A and 7B, in the optical image stabilizer of the camera module, the stopped state is reliably determined without having an error due to noise.

Figure 8A:
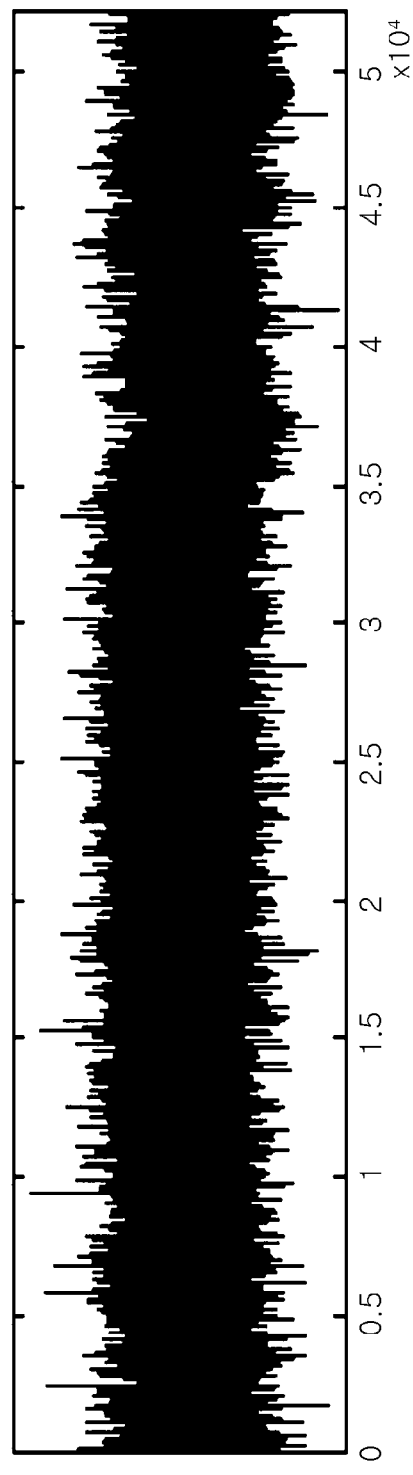
FIG. 8A is a graph illustrating an example of an angular position signal when a temperature has a predetermined deviation over time.

FIG. 8A is a graph illustrating an angular position signal a temperature has a predetermined deviation over time.

Figure 8B:
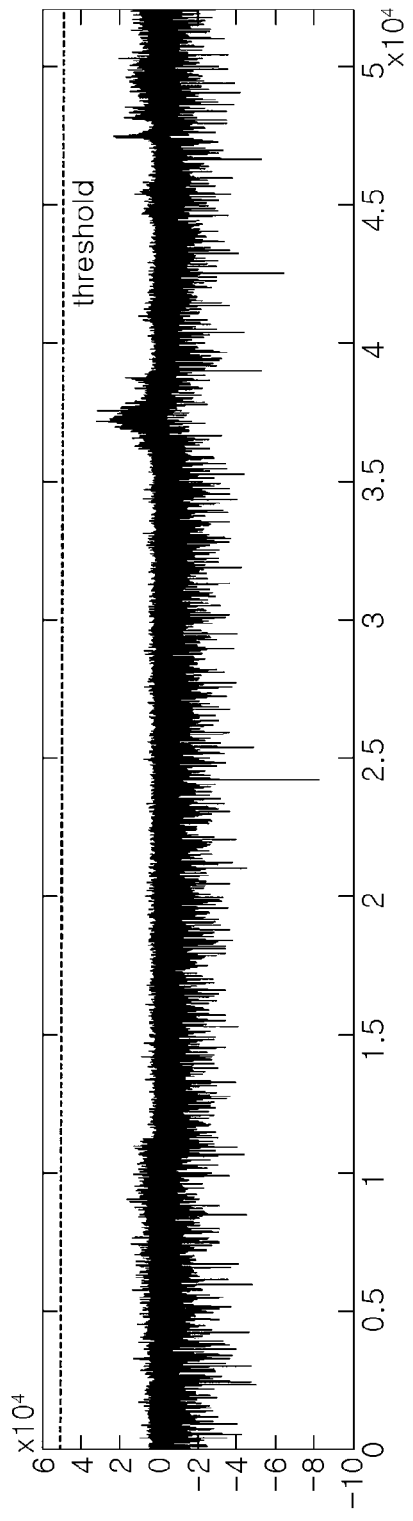
FIG. 8B is a graph illustrating an example of an autocorrelation value when the temperature has a predetermined deviation over time.

FIG. 8B is a graph illustrating an autocorrelation value calculated according to the angular position signal in the case in which the temperature has a predetermined deviation over time.

Referring to FIGS. 7A and 7B, in the optical image stabilizer of the camera module, the stopped state is reliably determined without having an error due to the deviation of the temperature.

As set forth above, in the optical image stabilizer and the camera module including the same according to exemplary embodiments, the stopped state may be reliably determined without being affected by noise, temperature, and the like.

The apparatuses, and other components, such as the angular velocity calculator, the lens controller, the state detector, the lens driver, the hall sensor, the angular velocity sensor, the offset remover, the filter, the integrator, and state detector illustrated in FIGS. 1 and 2, are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilizer, comprising:
   an angular velocity calculator configured to receive an angular velocity signal from an angular velocity sensor and output a corrected angular velocity signal and an angular position signal;
   a state detector configured to calculate an autocorrelation value on the corrected angular velocity signal, wherein the corrected angular velocity signal and the angular velocity signal from the angular velocity are devoid of luminance data, compare the autocorrelation value with a threshold value to determine a stopped state or a moving state of a camera module, and output a corrected angular position signal and control coefficients; and
   a lens controller configured to control a lens module according to the corrected angular position signal and the control coefficients.

2. The optical image stabilizer of claim 1, wherein the angular velocity calculator comprises:
   an offset remover configured to receive the angular velocity signal and remove an offset from the angular velocity signal;
   a filter configured to filter the angular velocity signal from which the offset has been removed; and
   an integrator configured to integrate the filtered angular velocity signal to output the angular position signal.

3. The optical image stabilizer of claim 1, wherein the autocorrelation value is calculated by multiplying the corrected angular velocity signal by a corrected angular velocity signal before time lag of the corrected angular velocity signal and summing values obtained by repeatedly multiplying the signals during a sampling period.

4. The optical image stabilizer of claim 1, wherein the state detector determines that the camera module is in the stopped state in response to the autocorrelation value being equal to or greater than the threshold value during a first determination period.

5. The optical image stabilizer of claim 1, wherein the state detector is configured to:
   determine when the camera module is in the stopped state,
   gradually decrease the corrected angular position signal and the control coefficients to values corresponding to a zero point in the stopped state, and
   output the values in response to determining the camera module is in a stopped state.

6. The optical image stabilizer of claim 1, wherein a number of samplings performed by the state detecting unit in a single sampling period of the corrected angular velocity signal for calculating the autocorrelation value is 20 to 100.

7. The optical image stabilizer of claim 1, wherein the state detector is configured to determine that the camera module is in the moving state in response to the autocorrelation value being equal to or greater than the threshold value during a second determination period.

8. The optical image stabilizer of claim 1, wherein the state detector is configured to:
   output the corrected angular position signal to follow the angular position signal during a following time, and
   output the corrected angular position signal having a same level as the angular position signal after the following time in response to determining that the camera module is in the moving state.

9. The optical image stabilizer of claim 1, wherein the angular velocity calculator is further configured to remove an offset from the angular velocity signal to generate the corrected angular velocity signal and selectively bypass either one or both of filtering and integration of the corrected angular velocity signal to branch the corrected angular velocity signal to the state detector.

10. The optical image stabilizer of claim 9, wherein the angular velocity calculator is further configured to selectively bypass High Pass Filtering (HPF) and integration of the corrected angular velocity signal based on the calculated autocorrelation value.

11. The optical image stabilizer of claim 1, wherein the autocorrelation value is calculated with an adaptively selected time lag value to establish an autocorrelation value difference between the moving state and the stopped state.

12. A camera module, comprising:
   an angular velocity sensor configured to detect an angular velocity and output an angular velocity signal;
   an angular velocity calculator configured to receive the angular velocity signal from the angular velocity sensor and output a corrected angular velocity signal and an angular position signal;
   a state detector configured to calculate an autocorrelation value on the corrected angular velocity signal, wherein the corrected angular velocity signal is devoid of luminance data, comparing the autocorrelation value with a threshold value to determine a stopped state or a moving state of the camera module, and output a corrected angular position signal and control coefficients;
   a lens controller configured to output a control signal according to the corrected angular position signal and the control coefficients; and
   a lens module configured to adjust a position of a lens barrel according to the control signal.

13. The camera module of claim 12, wherein the angular velocity calculator comprises:
   an offset remover configured to receive the angular velocity signal and remove an offset from the angular velocity signal;
   a filter configured to filter the angular velocity signal from which the offset has been removed; and
   an integrator configured to integrate the filtered angular velocity signal to output the angular position signal.

14. The camera module of claim 12, wherein the autocorrelation value is calculated by multiplying the corrected angular velocity signal by a corrected angular velocity signal before time lag of the corrected angular velocity signal and summing values obtained by repeatedly multiplying the signals during a sampling period.

15. The camera module of claim 12, wherein the state detector is configured to determine that the camera module is in the stopped state in response to the autocorrelation value being equal to or less than the threshold value during a first determination period.

16. The camera module of claim 12, wherein, the state detector is configured to gradually decrease the corrected angular position signal and the control coefficients to values corresponding to a zero point in the stopped state and outputs the values in response to the state detector determining that the camera module is in the stopped state.

17. The camera module of claim 12, wherein the number of samplings performed by the state detecting unit in a single sampling period of the corrected angular velocity signal for calculating the autocorrelation value is 20 to 100.

18. The camera module of claim 12, wherein the state detector determines that the camera module is in the moving state in response to the autocorrelation value being equal to or greater than the threshold value during a second determination period.

19. The camera module of claim 12, wherein the state detector is configured to:
   output the corrected angular position signal to follow the angular position signal during a following time, and
   output the corrected angular position signal having the same level as the angular position signal after the following time in response to the state detector determining that the camera module is in the moving state.

* * * * *